United States Patent Office 3,350,334
Patented Oct. 31, 1967

3,350,334
CASTOR OIL-HEXACHLOROENDOMETHYLENE-TETRAHYDROPHTHALIC ANHYDRIDE REACTION PRODUCT
Russell A. Skiff, La Mirada, Calif., assignor to North American Aviation, Inc.
No Drawing. Filed Dec. 31, 1962, Ser. No. 248,206
5 Claims. (Cl. 260—22)

This invention relates to a composition of matter comprising a reaction product of polyfunctional hydroxyl compounds with halogenated organic acid anhydrides and in a specific embodiment relates to a composition of matter comprising a reaction product of polyfunctional hydroxyl compounds with halogenated organic acid anhydrides combined with reactive monomeric materials.

Many reactive monomeric materials when cured to thermoset polymers have impaired utility for such applications as adhesives, encapsulating and potting compounds, and as laminating resins, because they are hard and are susceptible to shock and because they have a high dissipation factor and high dielectric constant. The inventive composition is added to monomeric materials and then the composition is cured to thermoset polymers producing polymeric materials with greatly improved properties.

The inventive composition is achieved by reacting a polyfunctional hydroxyl compound with a halogenated organic acid anhydride such as:

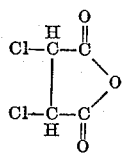

Dichloride maleic anhydride

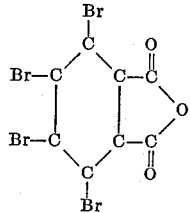

Tetrabromophthalic anhydride

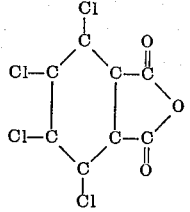

Tetrachlorophthalic anhydride

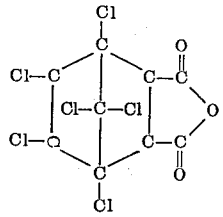

Hexachloroendomethylenetetrahydrophthalic anhydride
(hereinafter referred to as "Het" anhydride)

The polyhydroxyl compound may be a dihydroxyl containing compound such as ethylene glycol, a trihydroxyl containing compound such as glycerol or castor oil (triglyceride of ricinoleic acid), or one containing six or more hydroxy groups. Another example of a polyhydroxyl compound useful in the present invention is a polyoxy-1,2-propylene ether triol initiated with glycerine and having an average molecular weight in the range from 2500 to 3950. Such triols are commercially available as Dow P Voranol CP–2700 (molecular weight 2500–2900), Voranol CP–3000 (molecular weight 2900–3300), and Voranol CP–3500 (molecular weight 3350–3950).

The polyhydroxyl compound may also have substituted groups present within its molecular structure, for example, halogens, aliphatic groups, and aromatic groups. The polyhydroxyl compound may be completely saturated or may contain unsaturated groups. The polyhydroxyl compound used in preparing adducts can have from two carbon to three hundred carbon atoms between hydroxyl groups, however the preferred range is from seven carbon atoms to thirty carbon atoms between hydroxyl groups. The total number of hydroxyl groups present is not critical as to chemical structure except that one hydroxyl group must be present to react with one organic acid anhydride group. In other words a stoichiometric amount of the polyhydroxyl compound must be present in the reactive. The resulting composition is essentially a polybasic organic acid which contains a high percentage of stable halogens. When castor oil is used, the reaction product or adduct is a monoester prepared with three hydroxyl equivalent weights of castor oil to three formula weights of a halogenated organic acid anhydride such as hexachloroendomethylenetetrahydrophthalic anhydride. To insure a complete monoesterification an eleven percent excess of the acid anhydride based upon the three formula weights is used in the reaction.

When used with a resin system, the reaction product is mixed with the resin during preparation of the resin for use in a particular application.

It is therefore an object of this invention to provide a composition of matter comprised of chemically reactive materials having flexibility and flame retardant properties.

It is a further object of this invention to provide a polymer system having a rubber-like consistency, a low dielectric constant and dissipation factor.

It is another object of this invention to provide a reaction product having utility as a reactive flexibilizing and flame retardant agent for use with polymeric resin systems.

Still another object of this invention is to provide a cured polymeric resin system having rubber-like consistency.

Another object of this invention is to provide a monomeric resin having an improved dielectric constant and dissipation factor.

These and other objects of the invention will become apparent from the following description and detailed examples.

The following examples are illustrative of the reaction of polyfunctional hydroxyl reacted compounds with halogenated organic acid anhydrides. It should be understood that these examples demonstrate a preferred method by which the compound may be produced and describe the various elements of preferred compositions and should not be construed as limiting the invention to the parts or elements given.

Example 1

926 parts by weight of castor oil (hydroxyl equivalent=344) was heated to 290° F. in a two liter beaker. 1110 parts by weight of "Het" anhydride (formula weight=379.85) were added to the beaker containing the castor oil with constant agitation. One gram samples were extracted from the mixture every three minutes to make acid number determinations. Temperature readings were recorded at each sample time. The addition of the "Het"

anhydride to the castor oil caused the temperature to drop approximately 75° to 215° F. After approximately twenty minutes following the addition of the "Het" anhydride to castor oil, the temperature increased from 215° to 305° F. The reaction was complete when the actual acid number was determined to approximate the theoretical acid number. The yielded reaction product is represented by the following equation.

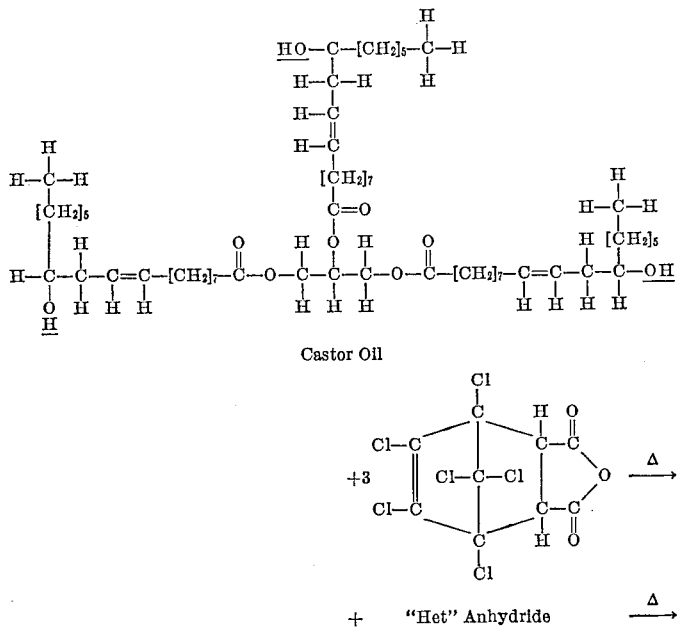

R' represents the atoms separating the terminal acid groups of the reaction product.

Although the temperature of 290° was used in the preceding example, it should be obvious to those skilled in the art that higher or lower temperatures may be used without substantial impairment of the qualitative usefulness of the reaction product. The speed of the reaction varies in a direct proportional relationship to the variation in the temperature of the polyfunctional hydroxyl.

If it is anticipated that the adduct will be combined with an epoxy resin system, a cross-linking or hardening agent such as hexahydrophthalic anhydride, methyl succinic anhydride, dodecenyl succinic anhydride, maleic anhydride, methyl nadic anhydride, or pyromellitic dianhydride may be added to the resin-adduct mixture to enhance the reaction rate and to obtain improved cross-linking. The sequence for adding in the separate ingredients is not important. The cross-linking agent is not a necessary addition to the triglyceride of ricinioleic-hexachloroendomethylenetetrahydrophthalic anhydride product and may be omitted or its addition may be deferred until the product is combined with a resin as indicated in Examples 7 through 12.

Other examples of processes yielding a reaction product are given without general discussion. It should be pointed out, however, that the general process for combining the individual compounds used in connection with Example 1 is similarly followed for Examples 2 through 6. The examples illustrate combinations of trihydroxyl containing compounds reacted with dibasic organic acid anhydrides.

*Example 2*

| | Parts by weight |
|---|---|
| Castor oil | 926 |
| "Het" anhydride | 741 |
| Hexahydrophthalic anhydride | 154.1 |

*Example 3*

| | |
|---|---|
| Castor oil | 926 |
| "Het" anhydride | 379.85 |
| Hexahydrophthalic anhydride | 308.2 |

*Example 4*

| | |
|---|---|
| A polyoxy - 1,2 - propylene ether triol initiated with glycerine (commercially available as Dow P Voranol CP-2700) (average molecular weight=2700) | 2700 |
| "Het" anhydride | 1113 |

*Example 5*

| | |
|---|---|
| A polyoxy-1,2-propylene ether triol initiated with glycerine (average molecular weight=3690) | 3690 |
| "Het" anhydride | 1112 |

The preceding examples are preferred embodiments of reaction product combinations comprising polyfunctional hydroxyl compounds, halogenated organic acid anhydrides and hardening agent (in Examples 2 and 3). Variations in electrical and physical properties within useful limits are achievable by using different combinations or slight variation in the parts by weight, and molecular weight of the combinations used.

The reaction product is suitable for combination with several type resins, resin monomers and, although preferred combinations are set out in Examples 7 through 14, the formula for one such composition is shown below.

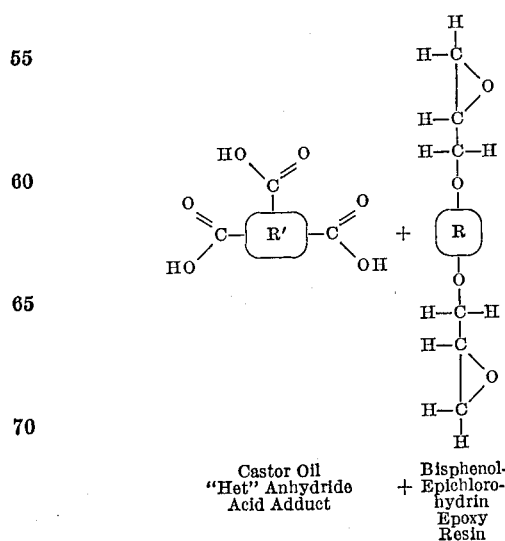

R' represents the atoms separating the terminal acid groups of the reaction product. R represents the atoms separating the terminal acid epoxide groups.

It should be understood by those skilled in the art that variations in the properties of the cured polymers is achievable, and that the above formula may be adjusted to reflect such a variation, by changing the epoxide equivalent of any resin class or type. The formula and composition is also changed by the addition of a promoter or accelerator such as:

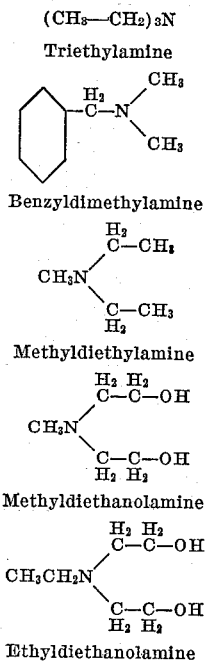

$(CH_3-CH_2)_3N$
Triethylamine

Benzyldimethylamine

Methyldiethylamine

Methyldiethanolamine

Ethyldiethanolamine

Also as indicated above a cross-linking or hardening agent may be added to the reaction product-resin monomer combination to speed up the final reaction of the system. The equivalent weight ratios of the compound used to achieve a cured resin system remain constant although the parts by weight ratio of the reaction product, a cross-linking agent, and amine accelerator are changed depending on the specific elements used.

The following examples are illustrative of the reaction product combined with various resin, promoters and cross-linking agents and the process involved for yielding a cured resin system having flexibility and flame retardant properties in addition to having an improved dielectric constant and dissipation factor as compared with resin systems lacking the reaction product.

*Example 7*

100 parts by weight of a peracetic acid resin (average epoxide equivalent=140) were combined in a beaker of suitable proportions with 302 parts by weight of a castor oil-"Het" anhydride adduct, 25.5 parts by weight of hexahydrophthalic anhydride as a cross-linking agent, and one part by weight of benzyldimethylene amine to promote the reaction rate of the mixture.

The mixture was then cured using state of the art curing methods. For example a container with the mixture may be heated in an oven at approximately 250° F. for a period of sixteen hours.

As a variation to Example 7, the mixture was used as an encapsulating compound for selected electronic assemblies and for transformers. The mixture was applied and allowed to cure. Tests were conducted which demonstrated the improved characteristics imparted to the cured resin by the addition of the reaction product. Some of the results of these tests are tabulated below.

DIELECTRIC CONSTANT AND DISSIPATION FACTOR COMPARISON

|  | Hysol 14-029 Flexible System | Hysol 15-050 Flexible System | Ex. 8 | Ex. 12 |
|---|---|---|---|---|
| Hardness (Shore D) | 80 | 76 | 78 | 75 |
| Elongation (percent) | 20 | 40 | 110 | 90 |
| Dielectric Constant: |  |  |  |  |
| 100 cycles | 4.47 | 4.38 | 3.3 | 3.29 |
| 100 kc | 3.55 | 3.88 | 2.8 | 3.17 |
| Dissipation Factor: |  |  |  |  |
| 100 cycles | .0373 | .0307 | .009 | .0096 |
| 100 kc | .0255 | .0151 | .010 | .0062 |

Examples 8 through 14 showing additional embodiments of the invention are given without general discussion as contained in Example 7. It should be understood however that the elements listed were combined in the same manner as described in Example 7.

*Example 8*

Parts by weight
Bisphenol A-epichlorohydrin resin (average epoxide equivalent=190) _____ 100
Castor oil "Het" anhydride adduct _____ 222.9
Dodecenyl succinic anhydride _____ 34.9
Benzyldimethylamine _____ 1.25

*Example 9*

Bisphenol A-epichlorohydrin resin (average epoxide equivalent=190) _____ 100
Castor oil "Het" anhydride adduct _____ 200
Dodecenyl succinic anhydride _____ 43.7
Benzyldimethylamine _____ 1.25

*Example 10*

Bisphenol A-epichlorohydrin resin (average epoxide=190) _____ 100
Castor oil "Het" anhydride adduct _____ 178.7
Dodecenyl succinic anhydride _____ 70
Benzyldimethylamine _____ .5

*Example 11*

Peracetic acid resin (average epoxide equivalent=75) _____ 100
Castor oil "Het" anhydride adduct _____ 454
Hexahydrophthalic anhydride _____ 87.5

*Example 12*

Bisphenol A-epichlorohydrin resin (average epoxide equivalent=190) _____ 100
Castor oil "Het" anhydride adduct _____ 178.7
Hexahydrophthalic anhydride _____ 34.5

*Example 13*

Peracetic resin (average epoxide equivalent=140) _____ 73.5
Castor oil "Het" anhydride adduct _____ 163
Hexahydrophthalic anhydride _____ 29.86
Benzyldimethylamine _____ 2.74

*Example 14*

Mixture of Bisphenol A-epichlorohydrin resin with peracetic acid resin type (average epoxide equivalent=160) _____ 100
Castor oil "Het" anhydride adduct _____ 213
Hexahydrophthalic anhydride _____ 41

It should be understood that other acid anhydrides, amines, epoxy resin, trihydroxyl compounds and reaction promoters other than those listed in the examples may be successfully used for providing polymeric materials as additional embodiments of the inventive composition. Some of the representative chemicals of the above classes which may be used are phthalic anhydride, maleic anhydride, promellitic dianhydride, nadic methyl anhydride, nadic anhydride, dichloromaleic anhydride, succinic anhydride, alhendic anhydride, methyldiethanol amine, dimethylaminomethyl phenol, tri (dimethylaminomethyl) phenol, diethylethanol amine, glycerol, hexanetriol, trimethylolpropane and polyglycols. Those skilled in the art should recognize that reaction rates, cure times, and cure temperatures will be dependent upon the chemical compositions of any given formulation. The properties of the cured polymers will be determined by the equivalent weight ratios of individual ingredients used and by the manner in which they are processed.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A process for achieving a polymer having rubber-like consistency, a low dielectric constant and a low dissipation factor, comprising the steps of;
   heating, to an elevated temperature below the decomposition temperature of the reactants, a polyfunctional hydroxyl compound selected from the class consisting of a polyoxy-1,2-propylene ether triol initiated with glycerine and having an average molecular weight in the range from 2500 to 3950, and castor oil,
   reacting with said heated polyfunctional hydroxyl compound a stoichiometric amount of halogenated organic acid anhydride,
   determining completion of the reaction between said polyfunctional hydroxyl compound and said halogenated organic acid anhydride,
   mixing said reaction products with an uncured bisphenol epichlorohydrin epoxy resin, and
   curing said mixture.
2. A composition of matter comprising 100 parts by weight of an epichlorohydrin p,p-dihydroxydiphenyl propane resin having an average epoxide equivalent of 190, 222.9 parts by weight of a castor oil hexachloroendomethylenetetrahydrophthalic anhydride adduct, 34.9 parts by weight of dodecenyl succinic anhydride, and 1.25 parts by weight of a benzyldimethylamine.
3. A composition of matter comprising 100 parts by weight of an epichlorohydrin p,p-dihydroxydiphenyl propane resin having an average epoxide equivalent of 190, 200 parts by weight of a castor oil hexachloroendomethylenetetrahydrophthalic anhydride adduct, 43.7 parts by weight of a dodecenyl succinic anhydride, and 1.25 parts by weight of benzyldimethylamine.
4. A composition of matter comprising 100 parts by weight of an epichlorohydrin p,p-dihydroxydiphenyl propane resin having an average epoxide equivalent of 190, 178.7 parts by weight of a castor oil hexachloroendomethylenetetrahydrophthalic anhydride adduct, 70 parts by weight of a dodecenyl succinic anhydride, and .5 part by weight of benzyldimethylamine.
5. A composition of matter comprising 100 parts by weight of an epichlorohydrin p,p-dihydroxydiphenyl propane resin having an average epoxide equivalent of 190, 178.7 parts by weight of a castor oil hexachloroendomethylenetetrahydrophthalic anhydride, and 34.5 parts by weight of hexahydrophthalic anhydride.

References Cited

UNITED STATES PATENTS

| | | | |
|---|---|---|---|
| 1,933,697 | 11/1933 | Barrett | 260—404.5 |
| 1,950,468 | 3/1934 | Zwilgmeyer | 260—22 |
| 2,027,467 | 1/1936 | Brubaker | 260—405 |
| 2,653,141 | 9/1953 | Greenlee | 260—18 |
| 2,939,858 | 6/1960 | Cummings | 260—75 |
| 2,966,479 | 12/1960 | Fischer | 260—78.4 |
| 2,967,837 | 1/1961 | Greenfield | 260—404.8 |
| 3,027,357 | 3/1962 | Stickle | 260—78.3 |
| 3,061,492 | 10/1962 | Singleton et al. | 260—75 |
| 3,098,047 | 7/1963 | Tapas et al. | 260—22 |
| 3,098,051 | 7/1963 | Matt | 260—404.8 |
| 3,238,227 | 3/1966 | Tinsley et al. | 260—75 |

OTHER REFERENCES

Chatfield, Varnish Constituents, Leonard Hill Limited, London, 3rd Ed., 1953, 863 pp., pp. 266–274 relied upon.

DONALD E. CZAJA, *Primary Examiner.*

LEON J. BERCOVITZ, SAMUEL H. BLECH,
*Examiners.*

R. W. GRIFFIN, *Assistant Examiner.*